United States Patent [19]

Franke et al.

[11] Patent Number: 4,764,984
[45] Date of Patent: Aug. 16, 1988

[54] FLUORESCENT SENSORS FOR INFRARED FREE-SPACE LINKS IN DATA COMMUNICATION SYSTEMS

[75] Inventors: Hilmar Franke, Bramsche, Fed. Rep. of Germany; Fritz R. Gfeller, Ossining, N.Y.

[73] Assignee: IBM Corporation, Armonk, N.Y.

[21] Appl. No.: 897,443

[22] Filed: Aug. 18, 1986

[51] Int. Cl.⁴ .............................................. H04B 9/00
[52] U.S. Cl. ................................ 455/619; 455/606; 250/361 R
[58] Field of Search ............... 455/619, 606, 607, 618; 250/361 R, 367, 362, 365, 487.1, 496.1

[56] References Cited

U.S. PATENT DOCUMENTS

| | | | |
|---|---|---|---|
| 4,081,672 | 3/1978 | Caspers et al. | 350/96.15 |
| 4,110,123 | 8/1978 | Goetzberger et al. | 250/367 |
| 4,262,206 | 4/1981 | Vighmann | 250/483.1 |
| 4,371,897 | 2/1983 | Kramer | 358/294 |
| 4,457,582 | 7/1984 | Lewis et al. | 455/606 |
| 4,467,208 | 8/1984 | Muller et al. | 250/483.1 |
| 4,506,153 | 3/1985 | Ohno | 250/227 |
| 4,599,537 | 7/1986 | Yamashita | 313/501 |

FOREIGN PATENT DOCUMENTS

| 186138 | 7/1986 | European Pat. Off. | 250/361 R |
|---|---|---|---|
| 57-154954 | 9/1982 | Japan | 455/608 |

OTHER PUBLICATIONS

Kapany, Fiber Optics, 1967, extracts from Chap. 2 (pp. 22-26) and Chap. 12.
Closs et al, "Wireless Connection Between a Controller and a Plurality of Terminals", IBM Technical Disclosure Bulletin, vol. 20, No. 7 (Dec. 1977).
Gfeller et al, "Infrared Communication for In-House Applications", presented at the IEEE COMPCON, 1978 (Washington, D.C.) pp. 132 et seq.
Gfeller et al, "Wireless In-House Data Communication via Diffuse Infrared Radiation", Proceedings of the IEEE, vol. 67, No. 11, pp. 1474 et seq (Nov. 1979).

*Primary Examiner*—Michael A. Masinick
*Attorney, Agent, or Firm*—Pollock, Vande Sande & Priddy

[57] ABSTRACT

A fluorescent activated light detector for detection of time modulated IR signals of preselected wavelength includes an IR light collecting member made of a solid transparent core material with a fluorescent light absorbing dye molecularly dispersed throughout the core. Photodiodes are operatively associated with the collecting member for detecting fluorescent light emitted by the collecting member upon exposure to incident IR radiation of the preselected wavelength. The light collecting member has a surface area A1 much greater than an active area A2 of the photosensing means. Use of this fluorescent activated light detector allows for increasing the effective transmission distance of infrared free space communication links without requiring an increase in transmitter radiated power.

20 Claims, 8 Drawing Sheets

FLUORESCENT SENSORS FOR INFRARED FREE-SPACE LINKS IN DATA COMMUNICATION SYSTEMS

FIELD OF THE INVENTION

This invention relates to infrared free space links in data communication systems and more specifically to such links employing fluorescent activated light detectors.

BACKGROUND OF THE INVENTION

Because of the enormous growth of computerization in the office environment, especially in the area of personal computers and their associated peripheral devices such as keyboards, printers etc., there is an increased need for flexible interconnection of these devices. Wireless infrared links are an attractive alternative to cabling. Such communication systems can be used beyond the office environment, i.e. anywhere communication is required between intelligent devices so long as sufficient signal power is available for the receiver.

Infrared free space links, where diffusely scattered infrared radiation serves as a carrier for the transmitted data, have numerous advantages. They allow greater flexibility in the placement of equipment within a room and easy reconfigurations. Since the infrared radiation is essentially confined to the room in which it is generated and cannot be easily detected from outside the room, there is no interference between transmission links operating in adjacent rooms. Freedom from electromagnetic interference is another significant advantage. The cost reduction in comparison with cabling constitutes another important advantage of infrared free space links over the use of cabling. Most of the data transmission systems using infrared links allow communication at 1 MBit/S over 10 to 15 meters by using diffuse reflections from walls and ceilings with several hundred milliwatts of optical power and a receiving photodiode area of 1 square centimeter.

Use of fluorescent activated optical detectors is known from U.S. Pat. No. 4,371,897 to Kramer. However this patent relates to a spatial, quantitative light detector for detecting light scattered from an information-bearing surface and is not concerned with increasing effective transmission distance in infrared free space data communication systems U.S. Pat. No. 4,506,153 to Ohno relates to an apparatus for transmitting light pulses of two different wavelengths along optical fiber paths to ON-OFF switches to detect an ON or OFF state of the switches by reflection/non-reflection dependent on switch status.

To widen applicability of free space infrared links in data communication systems it is desirable to increase the effective transmission distance between communicating devices without increasing or even in the face of decreasing optical transmission power. One way of achieving such an increase in transmission distance is by increasing the detector sensitive area so as to collect more infrared signal energy. However, this conventionally involves the use of a large area photodiode which is extremely expensive. Furthermore such diodes have capacitance of more than a hundred pF which would require an expensive receiver (for adaptive equalization and/or very high gain band-width product if a transimpedance configuration is chosen). As a practical matter, it is not feasible to increase the effective area for diffuse infrared radiation with passive optical systems such as lenses or mirrors.

The above described difficulties concerning the increase in transmission distance for data communication systems are solved by the present invention through use of a fluorescent activated infrared light detector coupled with optical transmission systems utilizing bipolar signals.

SUMMARY OF THE INVENTION

It is an object of the present invention to increase the effective transmission distance of infrared free space communication links without requiring an increase in transmitter radiated power. This object is achieved through use of a fluorescent activated optical detector device in which diffuse infrared radiation is absorbed over a large surface of a fluorescent activated collecting member; the fluorescent light emitted by this member upon exposure to the infrared radiation is detected by a small area photo-sensing means such as a low capacitance photodiode.

It is another object of the present invention to provide such an optical photo-sensing device that is simple and inexpensive in construction. To this end the fluorescent fibers are used as detector collecting members.

It is still another purpose of the present invention to provide an apparatus in a data communication system for receiving bipolar optical signals corresponding to transmitted data in the form of two preselected wavelength infrared signals. A differential, light detector apparatus comprises first and second optical fluorescent waveguide sensors, filtering means associated with those sensors, first and second detecting means for detecting fluorescent light emitted by the respective waveguide sensors upon exposure to the preselected infrared wavelengths and means responsive to the first and second detecting means for forming a differential signal. This differential input optical receiver has numerous advantages such as better noise immunity and AC-coupling without base wander. Furthermore fluctuations of background illuminations (or ambient light) are partially compensated for even if the background frequency spectrum overlaps the infrared signal spectrum.

It is also an additional purpose of the present invention to provide a transceiver device for a data communication system of a very simple construction comprising, in a common housing, a fluorescent waveguide sensor having a fluorescent fiber member for collecting transmitted infrared optical signals and emitting fluorescent light upon exposure to these infrared signals of predetermined wavelength, and a fiber infra-red emitter comprising an external radiation aperture for emitting optical signals corresponding to data to be transmitted and operatively associated with a light emitting diode and photosensing means wherein the surface of a collecting member of the fluorescent waveguide sensor is much larger than an active surface of the photosensing means.

BRIEF DESCRIPTION OF THE DRAWINGS

The preferred embodiment of the present invention will now be described in conjunction with the accompanying drawings in which.

PREFERRED EMBODIMENT OF THE PRESENT INVENTION

Figure 1A:
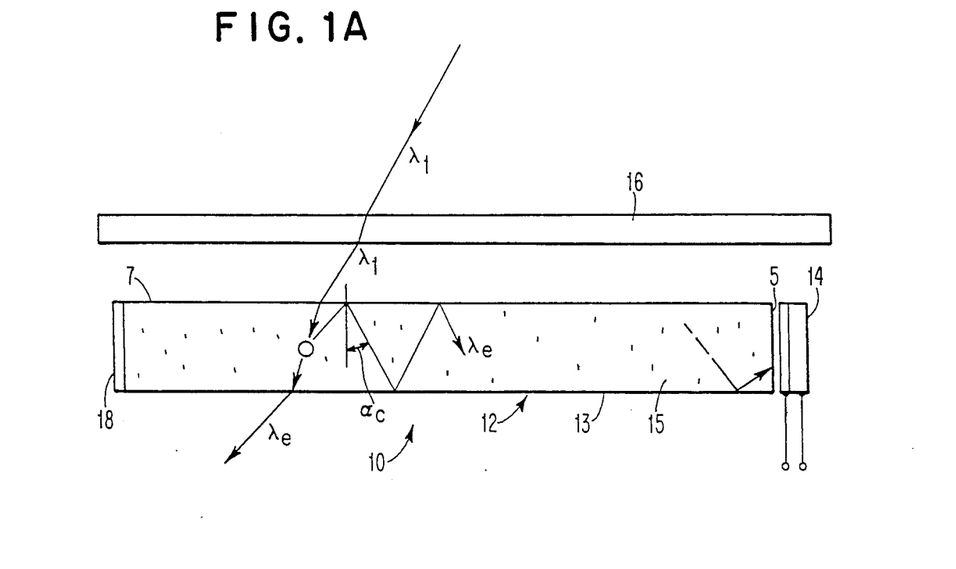
FIG. 1A shows a cross-section of one embodiment of a fluorescent activated light detector.
Figure 2A:
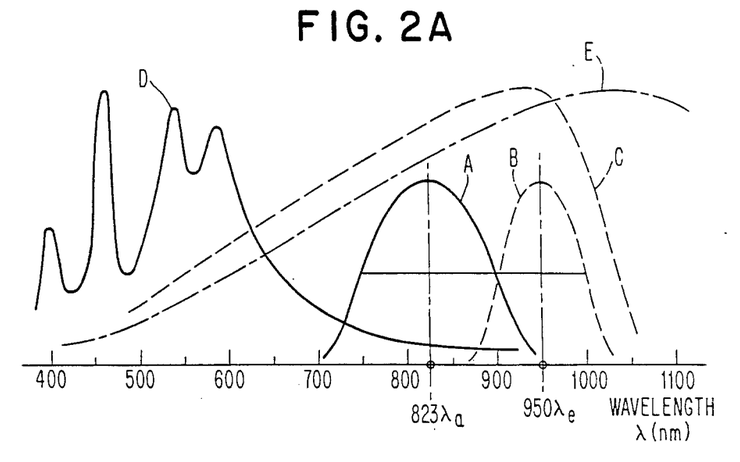
FIG. 2A shows typical ambient light spectrum relative to absorption band widths.

Referring to FIG. 1A, fluorescent activated light detector 10, shown in cross-section, comprises an infrared light collecting member 12 containing a solid transparent core material 13 which constitutes a fluorescent medium and a fluorescent light absorbing dye 15 molecularly dispersed throughout the core material 13. Dye 15 is represented in FIG. 1A as dots. The core material 13 can comprise for example, polymethyl-methacrylate (PMMA) or plexiglass. One suitable fluorescent dye chosen in the preferred embodiment is comprised of IR-140 with an absorption wavelength of 823 nm, a bandwidth of approximately 150 nm, an emission wavelength of 950 nm and relaxation time $1E-8$ seconds. A graphic illustration of dye emission and absorption spectrum for IR-140 is shown in FIG. 2A, as curves A and B, respectively. However, other dyes are available and can be used for the purpose of the present invention. Alternative fluorescent media include flexible silicon-rubber and liquid solutions. Instead of doping the bulk of the waveguide core 13 with the fluorescent dye 15 it is possible to provide a plexiglass rod or fiber coated with a flourescent film. The resulting structure provides certain geometrical gain factors, for example allowing the effective area of the wave-guide collector to be much larger in area compared to the area of an associated photodiode.

Infrared light energy at the pre-selected wave length $(\lambda_1)$, enters the core 13, is absorbed by the fluorescent dye 15 and re-radiated at a slightly different wavelength $(\lambda_e)$. Since the refractive index of the core material 13 is higher than the surrounding air, infrared light from all angles is allowed to enter the core and excite the dye molecules 15. However, after re-emission at a slightly longer wavelength, light energy impinging on the collecting member interface at an angle larger than the critical angle $(\alpha_c)$ is trapped within the collecting member 12 and proceeds along the core by the phenomenon of multiple total internal reflections from the collecting member interior surface towards the end of the collecting member. The light trapping ability of the fluorescent fiber 13, comprising collecting member 12, provides a high degree of efficiency or gain.

The fluorescent activated detector 10 shown in Figure 1A also includes photo-sensing means for detecting the radiation emitted by collecting member 12 upon its exposure to the incident, infrared radiation of wavelength $(\lambda_1)$. In the embodiment shown in Figures 1A and 1B, the photo-sensing means comprises a low capacity SI-pin photodiode 14, having a spectrum shown in FIG. 1A as curve C. The photodiode 14 is located at one end 5 of the collecting member 12. A mirror 18 can be located at another end 7 of the collecting member 12 opposite to that of the photodiode. The mirror 18 is provided to reduce radiation losses and increase the efficiency of the collecting member 12. Filter 16 is provided for passing infrared radiation of preselected wavelength $(\lambda_1)$ to collecting member 12. The geometry of the collecting member such as the core length/diameter ratio is chosen so that the effective area of the lightcollecting surface of the collecting material 12 is as large as possible compared to the sensing means area, while minimizing absorption losses within the waveguide. According to the present invention, a fluorescent fiber bulk preferably used as the collecting member has a large collecting surface A-1, which allows the use of the photosensing means associated with the collecting member to be of much smaller active detecting area A-2.

Figure 1B:
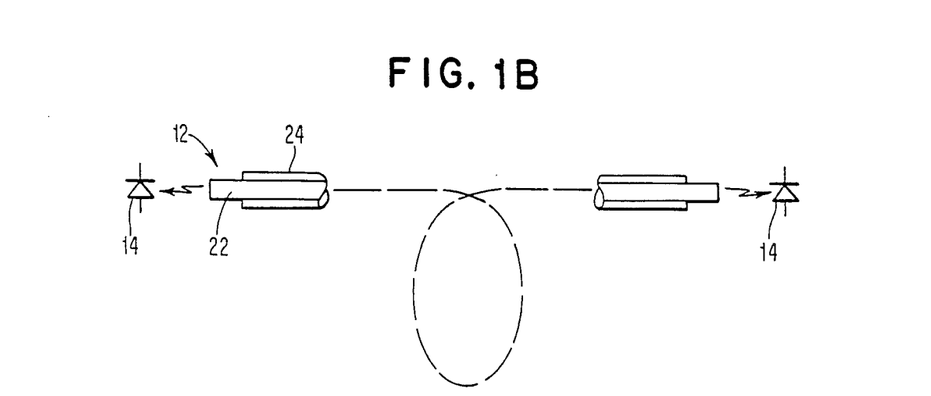
FIG. 1B schematically shows another embodiment of a fluorescent activated light detector.

FIG. 1B shows an embodiment in which collecting member 12 comprises a plexiglass fiber 22 with fluorescent coating 24. Coating 24 may be applied by dip-coating or indiffusion. Dip coating employs a monomer with a polymer dye solution and indiffusion requires dipping the rod into a solution of monomer and dye.

Figure 3A:
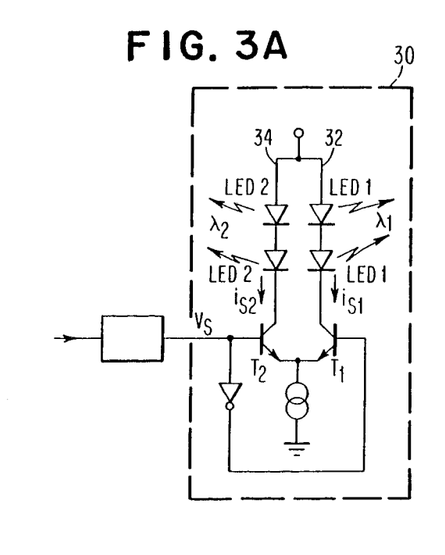
FIG. 3A shows a differential transmitter for transmission of infrared optical signals.

The fluorescent activated light detectors can be applied to data communication for the reception of bi-polar optical signals. Communication data in the form of bi-polar optical signals is transmitted in the form of two signals of different wave-lengths: $(\lambda_1)$ and $(\lambda_2)$. At the receiver end, these two signals in the form of energy at two infrared optical wave-lengths are detected with two separate waveguide sensors each comprising the collecting members of FIG. 1 in which each sensor is sensitive to one preselected infrared wavelength. Such receiver is illustrated and described in connection with FIG. 3B. FIG. 3A shows a basic circuit diagram representing a differential transmitter 30 for transmitting data wherein analog data is converted into the form of optical infrared signals of two predetermined wavelengths. Each leg 32, 34 of the differential transmitter 30 drives a set of light emitting diodes LED 1 and LED 2 which emit optical signals corresponding to the electronic data at different predetermined wavelengths $(\lambda_1)$ and $(\lambda_2)$, respectively. Transistors $T_1$ and $T_2$, controlling LED circuits 32 and 34 operate in complementary fashion to allow alternative flow of currents $IS_1$ and $IS_2$. When input signal $V_s$ forward biases transistor $T_2$ the transistor $T_1$ is non-conducting by operation of the inverter whose output biases $T_1$. On the other hand when the input signal forward biases $T_1$, $T_2$ is cut off. As the input signal $V_s$ varies in polarity, optical energy is emitted at LED 1 or LED 2 depending on the polarity of $V_s$. This is referred to as a bipolar optical signal. The use of the differential configuration is advantageous since it produces less switching noise. It is also more efficient since during each cycle electrical current is converted to a light signal.

Figure 3B:
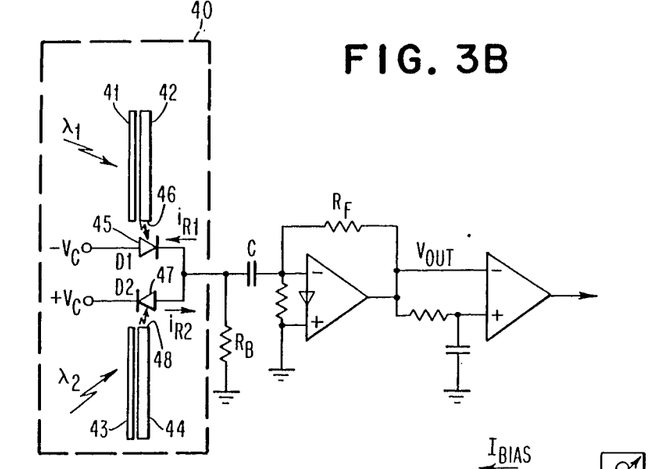
FIG. 3B shows a differential input optical receiver for two wavelength sensors.

FIG. 3B shows the fluorescent activated light detector 40 which receives the bi-polar optical signals sent by the differential transmitter 30 of FIG. 3A. The first waveguide sensor (including filter 41 and detector 42) is sensitive to a first wavelength ($\lambda_1$) emitted by LED 1. The associated filter 41 passes the optical signal of infrared radiation ($\lambda_1$) to the waveguide 42. Upon exposure to infrared radiation ($\lambda_1$) fluorescent light is emitted by waveguide 42 and detected by photosensing means 45 at its end 46. The second waveguide sensor (including filter 43 and detector 44) is sensitive to the second wavelength ($\lambda_2$), transmitted by LED 2 of the differential transmitter 30. Second filtering means 43 is associated with waveguide 44 for passing the infrared wavelength ($\lambda_2$). Fluorescent light emitted by waveguide 44 is detected by the second sensing means 47 at its end 48.

Figure 2B:
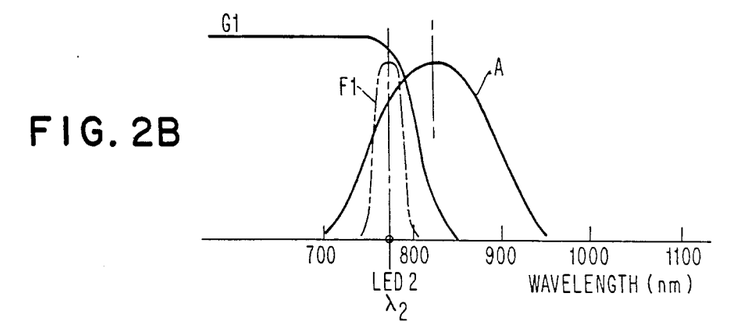
FIGS. 2B and 2C show the wavelength spectra and filter absorption characteristics for the selected light emitting diode wavelengths.
Figure 2C:
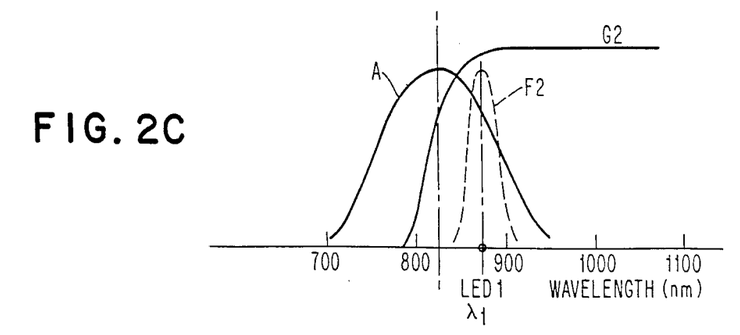

Infrared signals of wavelength ($\lambda_2$) are rejected or absorbed by the filtering means 41, whereas infrared radiation of wavelength ($\lambda_1$) is absorbed or rejected by filtering means 42. The wavelengths' spectra F1 and F2 and filtering means absorption characteristics G1 and G2 are shown in FIGS. 2B and 2C. As is evident from FIGS. 2B and 2C the two optical wavelengths ($\lambda_1$) and ($\lambda_2$) transmitted by the two light emitting diodes LED 1 and LED 2 are located within the absorption band of the fluorescent dye shown as curve A. The filtering means 41, 43 can be represented by high-pass or low-pass optical filters or can be replaced by interference filters with passbands at the respective light emitting diodes' wavelengths.

In another embodiment, the filtering can be achieved by doping the waveguide collecting member with different fluorescent dyes that are sensitive to only one of the two wavelengths ($\lambda_1$) or ($\lambda_2$). Such a structure eliminates the use of optical filters. However, for best results in connection with this embodiment the two wavelengths, ($\lambda_1$) and ($\lambda_2$) must be spaced further apart (than in the preferred embodiment) due to the widths of the absorption bands.

Figure 4A:
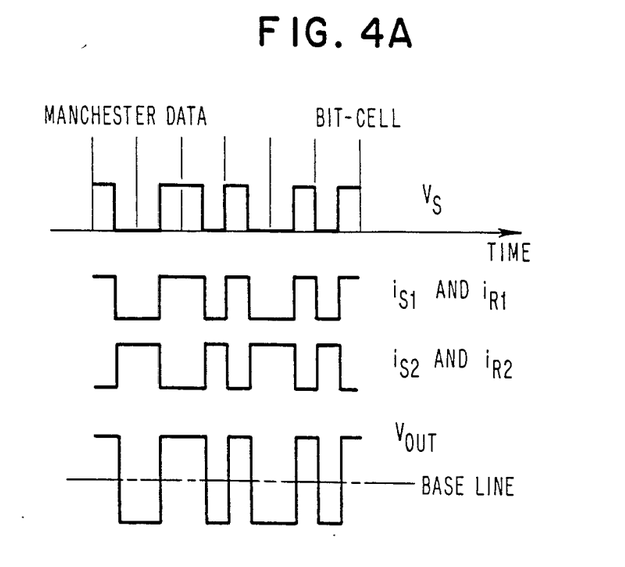
FIG. 4A shows the signal wave shapes corresponding to transmitted Manchester encoded data.

The two photodiodes D1 and D2 constituting photosensing means 45 and 47 in detector 40 convert the fluorescent light emitted by waveguide sensors 42 and 44 into two currents IR 1 and IR 2, respectively. Since the photodiodes D1 and D2 are connected with opposite polarities the photo-currents produced by each cycle wavelength flow in opposite directions. The resistor Rb and capacitor C serve as a bypass for DC or low AC photo-currents produced by ambient light. The data sent in the form of two optical wavelengths is of the Manchester type. FIG. 4A shows the corresponding wave shapes involved in the Manchester data. The amplifiers used are of the Norton type having differentiating current inputs.

The amplifier 50 is responsive to the first and second photosensing diodes producing currents IR 1 and IR 2 for forming a differential signal corresponding to received data signals.

The bipolar configuration of fluorescent activated light detector 40 partially rejects ambient light which may be present due to the presence of the fluorescent tubes and incandescent bulbs in the environment in which data communications systems operate. This is true even if the signal spectrum overlaps with the interfering or ambient spectrum. Each waveguide 42, 44 traps a narrow range of ambient light spectrum, shown as shaded portions in Figures 2B and 2C. As is evident from FIG. 2A the typical ambient light spectrum, represented in FIG. 2A as curve D for fluorescent tubes and curve E for tungsten lamps, is relatively flat over the absorption band width. The corresponding photo-currents generated in D1 and D2 are approximately equal and the difference is obtained in the front end detection circuit 50. By varying the effective area A1 or length of each waveguide collecting member and the optical transmission power relative to their wavelengths ($\lambda_1$) and ($\lambda_2$) it is possible to adjust the bipolar signal currents to the same amplitude while substantially cancelling the photocurrents produced by ambient light.

Figure 4B:
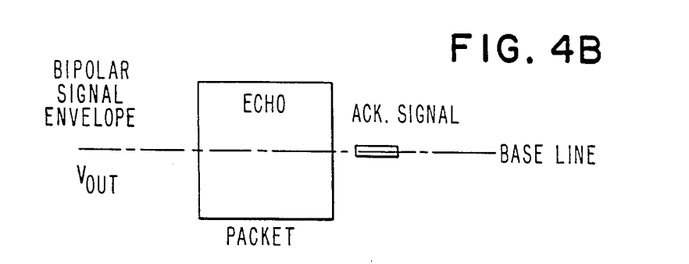
FIGS. 4B and 4C show the bipolar signal configurations allowing AC-coupling.
Figure 4C:
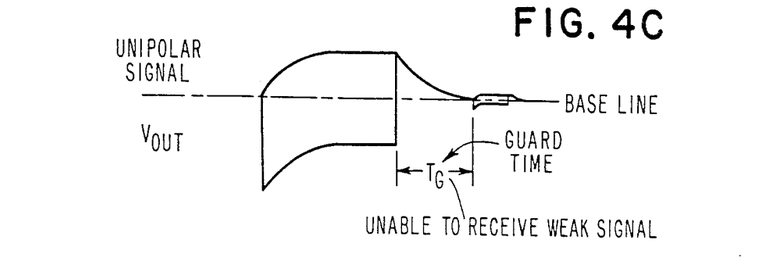

The bipolar configuration of the fluorescent light detector also allows AC coupling without suffering the adverse effects of baseline wander as evident from FIGS. 4B and 4C. The advantages include little distortion of the signal envelope at the beginning and at the end of the data package and shorter guard time between packets of unequal amplitude.

Figure 3C:
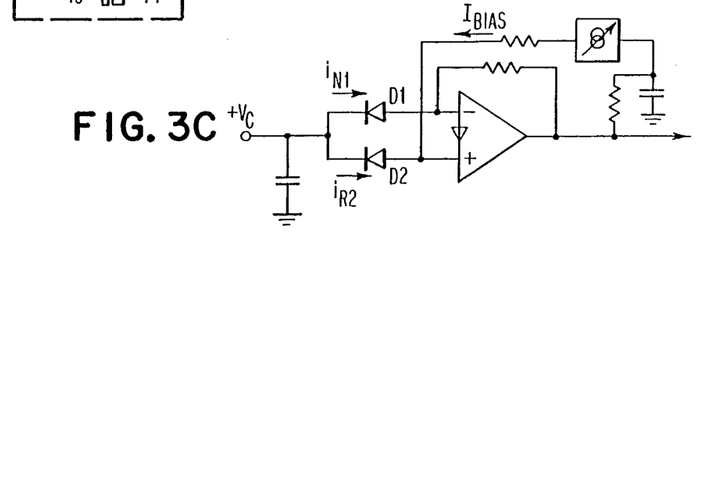
FIG. 3C shows a differential input front-end.

FIG. 3C shows a differential input front end based on the previous principle. The advantage of the configuration shown in FIG. 3C lies in the reduced sensitivity of the detector to noise pickup and better common mode rejection.

Figure 5A:
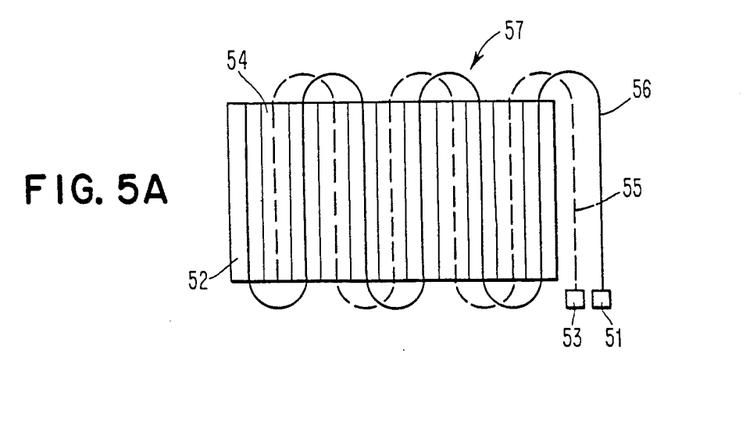
FIGS. 5A and 5B show different embodiments for bipolar fluorescent waveguide sensors.
Figure 5B:
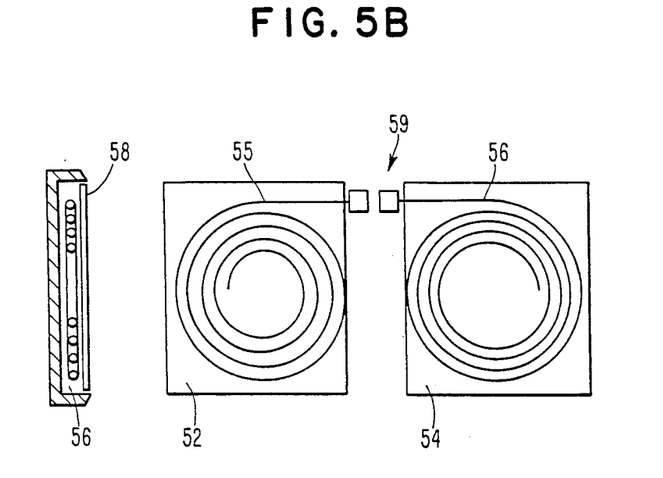

FIGS. 5A and 5B show two embodiments for a bipolar fluorescent waveguide detector. In FIG. 5A filtering means 52, 54 sensitive to different wavelengths ($\lambda_1$) and ($\lambda_2$), respectively, are arranged alternately to provide a base for thick fluorescent fibers 55 and 56. Fiber 55 is associated with diode 53 which detects fluorescent light emitted by fiber 55, whereas fiber 56 is associated with diode 51 for detecting emission of fluorescent light from fiber 56. In FIG. 5B bipolar fluorescent light detector 59 includes filter 52 sensitive to wavelength ($\lambda_1$), and filter 54 sensitive to wavelength ($\lambda_2$). The filters 52 and 54 form substantially rectangular bases which are spaced apart. Fiber 55 is disposed on filter 52 and fiber 56 is disposed on filter 54. Diodes D1 and D2 are located next to the respective filtering means 52 and 54 and additional filtering means 58 with reflective interior 56 is provided at one end of the photodetector to reduce absorption losses.

Figure 6A:
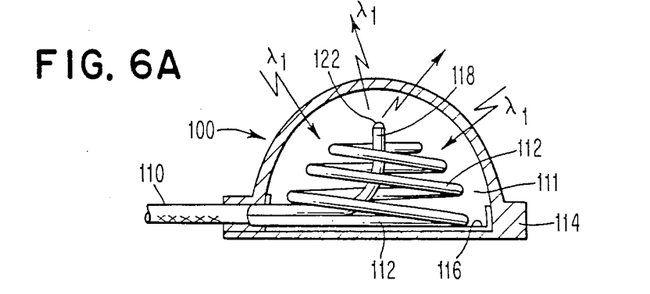
FIGS. 6A-6C show a unipolar transceiver used in a data communication system.
Figure 6B:
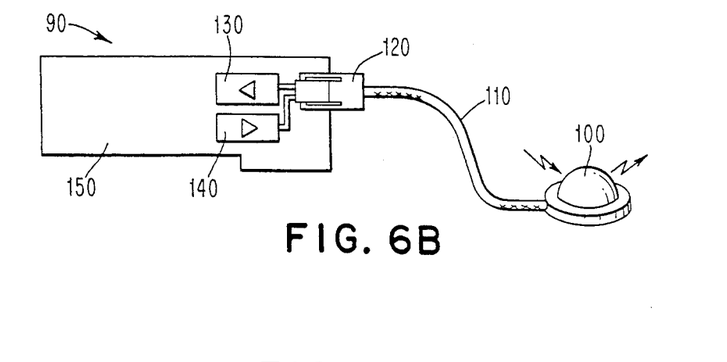
Figure 6C:
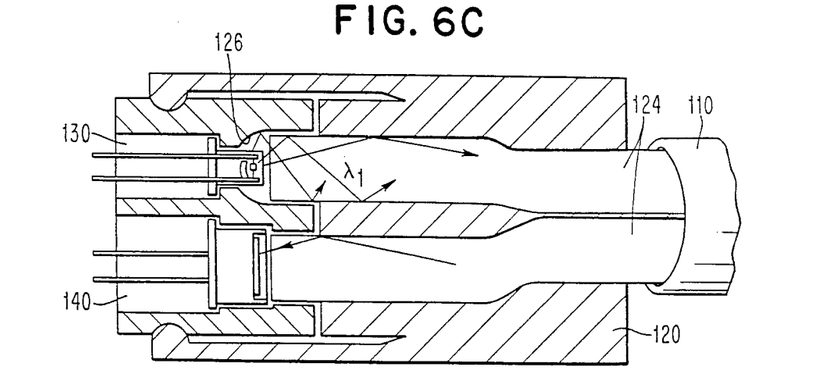

FIG. 6 (including FIGS. 6A–6C) shows a transceiver including an element 100 used in a data communication system for transmitting data in the form of IR optical signals. The transceiver element 100 comprises a fluorescent waveguide sensor 111 made of fluorescent fiber member 112 for collecting transmitted infrared optical signals of predetermined wavelength ($\lambda_1$) and emitting fluorescent light upon exposure to these infrared signals and fiber emitter 118 with an external radiation aperture 122 for emitting infrared optical signals corresponding to transmitted data. Both sensor 111 and emitter 118 are located in a common housing 114. Diffuse reflector 116 at the bottom of housing 114 provides for reduction of absorption losses. The transceiver also includes element 90 with a light emitting diode 130 for emitting optical infrared signals corresponding to transmitted data, and photodiode 140 for detecting fluorescent light emitted by the waveguide sensor 111. At least two flexible fibers 124 (see FIG. 6C) are provided, one for connecting the waveguide sensor 111 to the photodiode 140 and the other for connecting fiber emitter 118 to the light emitting diode 130. Reflector block 126 associated with photodiode 140 and LED 130 reduces absorption losses. Both LED 130 and photodiode 140 may be mounted on a data transmitting device 150 PC card and coupled by means of connector 120 to flexible fibers 124 housed in a light guide cable 110. For operation of the apparatus shown in FIGS. 6A, 6B, and 6C as a data transmitter, the electronic data signals input to LED 130 are converted into optical infrared signals of preselected wavelength ($\lambda_1$) and are guided over a short distance in one flexible waveguide 124 to the radiation aperture 122 of the emitter 118. The flexible waveguide 124 comprises a large core diameter with no cladding in order to increase the coupling efficiency. Preferably the length of the flexible waveguide (124) is in a range of about 30 to 100 cm. For operation of transceiver as a receiver of infrared radiation (emitted by a transmitter or transceiver located on another computer connected by a free space link), the signals in the form of infrared radiation of preselected wavelength are detected by fluorescent fiber 112 and the radiation energy is guided to the photosensing means 140, detected by those means and subsequently converted into data signals. As evident from FIGS. 6A, 6B, and 6C, the effective collecting area A1 of the fluorescent fiber 112 is much larger than the active area A2 of the photosensing means. Since optical energy is collected over the area A1, the ratio A1/A2 reflects a receiver gain. This gain allows for much smaller optical energy density than would be the case if the effective receiver area was limited to that of the sensing area A2. This allows one to increase practical transmission distances, between data transmitting and receiving devices in a data communication network, without increasing optical transmission power. For coverage of a larger transmission distance, several LED would be necessary for emitting optical signals in the form of the selected wavelength. The transceiver 90, 100 shown in FIGS. 6A, 6B, and 6C is of unipolar form, however, the invention can be extended to bipolar form by incorporating a fluorescent activated light detector 40 shown in FIG. 3B, and using two sets of light emitting diodes for transmitting data in the form of two optical signals of different wavelengths ($\lambda_1$) and ($\lambda_2$). The bipolar transceiver will further include means for forming differential signals responsive to photosensing means. All electronic components used in the apparatus shown in FIGS. 6A-6C are mounted internally on a printed circuit board, for reducing EMI problems.

Figure 7:
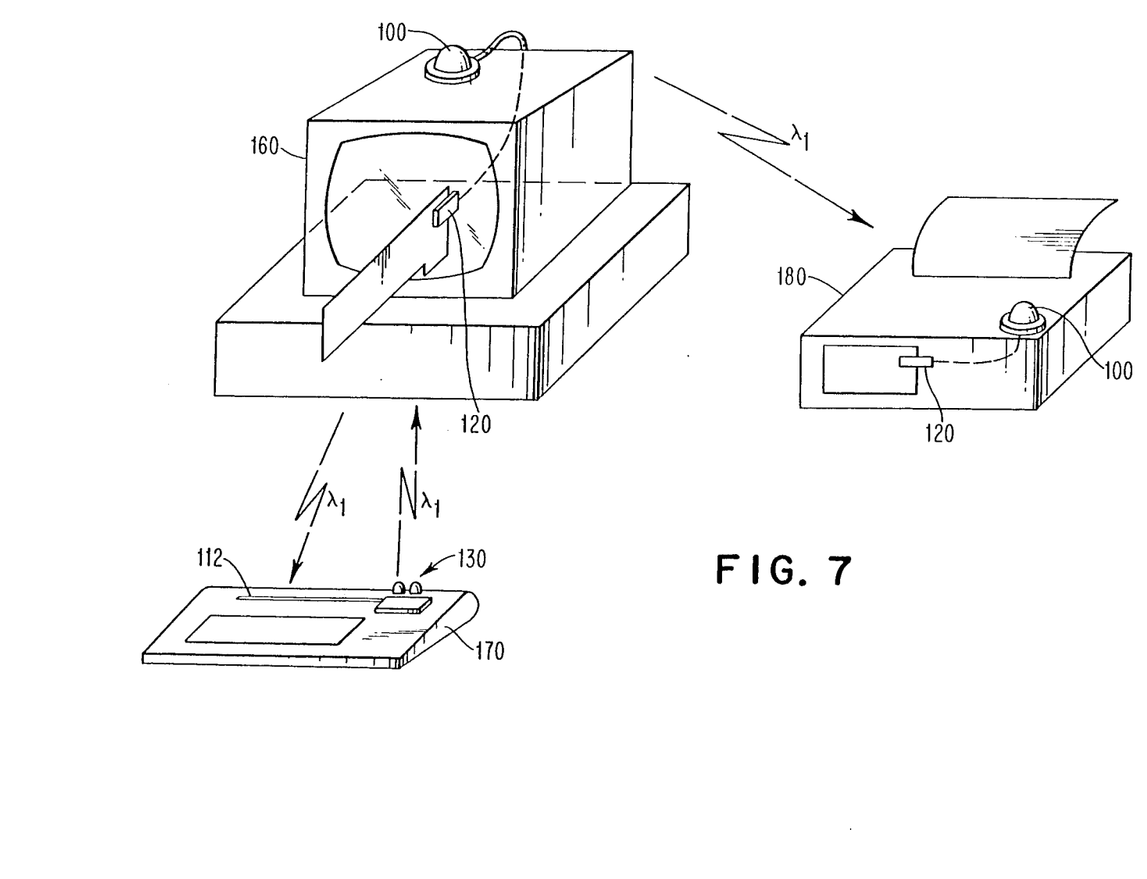
FIG. 7 shows possible mounting schemes for the transceiver of FIG. 6.

FIG. 7 shows applications for the transceiver of FIG. 6. FIG. 7 shows personal computer 160, keyboard 170 and printer 180. Printer 180 has a transceiver 100 and connector 120 internally mounted whereas PC 160 shows transceiver 100 and connector 120 externally mounted thereon. The fluorescent fiber 112 and LEDs 130 are also shown externally mounted on keyboard 170.

Figure 8:
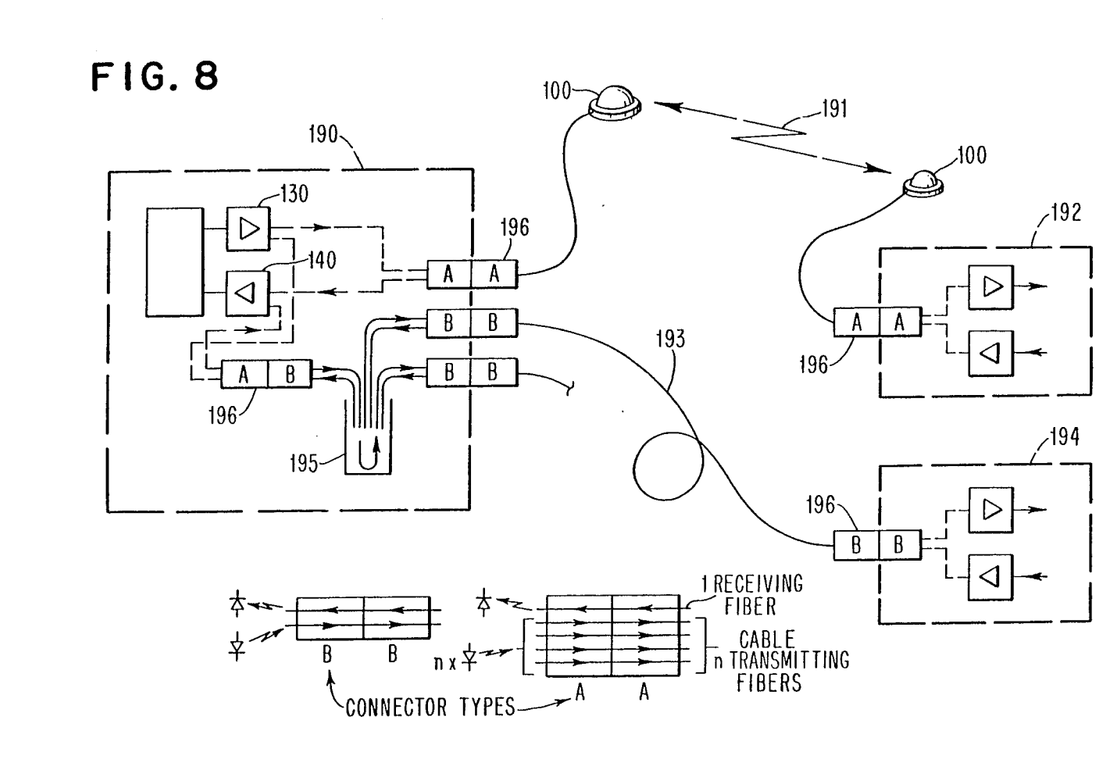
FIG. 8 shows a network with transceivers interconnected by fibers or free space links.

FIG. 8 is an example of a communication network comprising a plurality of transceivers which are connected either by fibers or free space links. Data communication system PC card 190 can receive and transmit data to/from peripheral devices 192 and 194 either by use of free space links 191 between its transceivers 100 or by use of fiber cable 193. In order to add the plastic fiber feature for fiber links, only a set of plastic fiber connectors 196 and a fiber star coupler 195 is required. Star coupler 195 is well known and described for example in an article by M. C. Hudson and F. L. Thiel, "The Star Coupler: A Unique Interconnection Component for Multimode Optical Waveguide Communication Systems", Applied Optics, Vol. 13, November, 1974.

Fiber connectors 196B are also well known and commercially available. They interconnect large-core plastic fibers or multimode glass fibers. Connector type 196A is shown in FIG. 6C for only one transmitting fiber and one receiving fluorescent fiber. In practice at least 10-20 large-core plastic fibers are employed (see FIG. 8 A—A connector). If it is necessary to provide a fiber link to connect one or several devices located at longer distances or in differing rooms, the transceiver 90, 100 can be replaced by fiber cable 193.

While a particular embodiment of the invention has been shown, it should be understood, of course, that the invention is not limited thereto, since modifications may be made, and it is contemplated to cover by the appended claims any such modifications as fall within the spirit and scope of the invention.

Having thus described our invention, what we claim as new, and desire to secure by Letters Patent is:

1. A fluorescent-activated light detector for detection of time modulated IR signals of preselected wavelength comprising:
   an IR-light collecting member, said member comprising a solid transparent core material with a fluorescent light absorbing dye molecularly dispersed therein;
   photosensing means operatively associated with said member for detecting fluorescent light emitted by said member upon exposure to incident IR radiation of said preselected wavelength;
   wherein said light collecting member has a surface area A1, said photosensing means has an active area A2 and wherein A1 is much greater than A2.

2. A fluorescent-activated light detector for detection of time modulated IR signals of preselected wavelength comprising:
   an IR-light collecting member, said member comprising a solid transparent core material and a fluorescent light absorbing dye layer adjacent said material;
   photosensing means operatively associated with said member for detecting fluorescent light emitted by said member upon exposure to incident IR radiation of said preselected wavelength;
   wherein said light collecting member has a surface area A1, said photosensing means has an active area A2 and wherein A1 is much greater than A2.

3. A fluorescent-activated light detector according to claim 1 or 2 further comprising:
   filtering means associated with said collecting member for passing to said collecting member IR radiation of said preselected wavelength.

4. A fluorescent-activated light detector according to claim 1 or 2 wherein said photosensing means comprises a low capacitance photodiode.

5. A light detector according to claim 3 wherein said photosensing means includes a photodiode located at one end of said collecting member.

6. A fluorescent-activated light detector according to claim 1 wherein said collecting member comprises a ribbon of fluorescent fiber.

7. A light detector according to claim 6 in which said photosensing means includes a photodiode and further comprising a mirror located at one end of said collection member opposite to said photodiode.

8. A fluorescent-activated light detector comprising:
   first collecting means sensitive to a first preselected IR-wavelength for emitting fluorescent light;
   second collecting means sensitive to a second preselected IR-wavelength for emitting fluorescent light;
   first filtering means associated with said first collecting means for passing said first preselected IR-wavelength to said first collecting means and rejecting energy of said second preselected IR-wavelength;

second filtering means associated with said second collecting means for passing said second preselected IR-wavelength to said second collecting means and rejecting energy of said first preselected IR-wavelength;

first photosensing means operatively associated with said first collecting means for detecting fluorescent light emitted by said first collecting means upon exposure to incident energy of said first preselected IR-wavelength;

second photosensing means operatively associated with said second collecting means for detecting fluorescent light emitted by said second collecting means upon exposure to incident energy of said second preselected IR-wavelength; and means responsive to said first and second photosensing means for forming a differential signal.

9. In a data communication system an apparatus for receiving bipolar optical signals in the form of two preselected wavelength IR-signals comprising:
 a differential light detector, said detector comprising:
 first optical waveguide sensor means sensitive to a first preselected wavelength for emitting fluorescent energy;
 second optical waveguide sensor means sensitive to a second preselected wavelength for emitting fluorescent energy;
 a first filtering means associated with said first waveguide sensor means for passing to said first waveguide sensor means IR energy of said first preselected wavelength and absorbing energy of said second preselected wavelength;
 a second filtering means associated with said second waveguide sensor means for passing to said second waveguide sensor means IR energy of said second preselected wavelength and absorbing energy of said first preselected wavelength;
 first photosensing means operatively associated with said first waveguide sensor means for detecting fluorescent light emitted by said first waveguide sensor means upon exposure to incident energy of said first preselected wavelength;
 second photosensing means operatively associated with said second waveguide sensor means for detecting fluorescent light emitted by said second waveguide sensor means upon exposure to incident energy of said second preselected wavelength; and
 means responsive to said first and second photosensing means for forming a differential signal.

10. An apparatus according to claim 9 wherein said first and second waveguide sensors each comprise an IR light collecting member, said member comprising a solid transparent core material with a fluorescent light absorbing dye molecularly dispersed therethrough, wherein said collecting members have a surface area A1, said photosensing means have an active area A2 and wherein A1 is much greater than A2.

11. An apparatus according to claim 9 wherein said first and second waveguide sensors comprise an IR light collecting member, said member comprising a solid transparent core material with a fluorescent light absorbing dye layer adjacent said material, wherein said collecting members have a surface area A1, said photosensing means have an active area A2 and wherein A1 is much greater than A2.

12. An apparatus according to claim 10 or 11 wherein said first and second filtering means comprise optical filters.

13. An apparatus according to claim 10 wherein said core materials of said first and second waveguide sensors are doped with different fluorescent light absorbing dyes sensitive to said first and second preselected wavelengths respectively, said fluorescent dyes constituting said filtering means.

14. In a data communication system for transmitting data in the form of IR optical signals, a transceiver comprising:
 a fluorescent waveguide sensor comprising a fluorescent fiber member for collecting transmitted IR optical signals and emitting fluorescent light upon exposure to said IR signals;
 a fiber emitter means for emitting IR optical signals corresponding to said data through a radiation emitting aperture;
 and a common housing for said sensor and emitter means, wherein said housing includes a diffuse reflector for reduction of absorption losses.

15. A transceiver according to claim 14 wherein said fiber emitter means includes a light emitting diode (LED) for emitting optical infrared signals corresponding to transmitted data; and which further includes:
 a photodiode for detecting fluorescent light emitted by said waveguide sensor;
 at least two flexible fibers, one connecting said waveguide sensor to said photodiode, and another connecting said fiber emitter means to said LED for transmitting optical signals therebetween and wherein said fluorescent fiber member of said waveguide sensor has a surface area A1, said photodiode has an active area A2 and wherein A1 is much greater than A2.

16. A transceiver according to claim 15 wherein said flexible fibers are disposed in a waveguide cable.

17. In a data communication system an apparatus for transmitting data in the form of bi-polar IR optical signals comprising two transceivers according to claim 16 wherein the first transceiver is sensitive to a first preselected IR radiation wavelength and the second transceiver is sensitive to a second preselected IR radiation wavelength, said apparatus further comprising means for receiving differential signals from photodiodes of said first and second transceivers.

18. In a data communication system a network comprising a plurality of transceivers according to claim 16 wherein said transceivers are interconnected by free space links.

19. In a data communication system a network comprising a plurality of transceivers according to claim 16 wherein said transceivers are interconnected by fiber cable.

20. In a data communication system a network comprising a plurality of transceivers according to claim 16 wherein some of said transceivers are interconnected by fibers and some by free space links.

* * * * *